(12) United States Patent
Wu et al.

(10) Patent No.: US 11,306,753 B2
(45) Date of Patent: Apr. 19, 2022

(54) BOARD MEMBER FASTENER

(71) Applicant: HANWIT PRECISION INDUSTRIES LTD., New Taipei (TW)

(72) Inventors: Ming-De Wu, New Taipei (TW); Chih-Wei Chou, New Taipei (TW)

(73) Assignee: HANWIT PRECISION INDUSTRIES LTD., New Taipei (TW)

( * ) Notice: Subject to any disclaimer, the term of this patent is extended or adjusted under 35 U.S.C. 154(b) by 0 days.

(21) Appl. No.: 17/103,408

(22) Filed: Nov. 24, 2020

(65) Prior Publication Data
US 2021/0102566 A1 Apr. 8, 2021

Related U.S. Application Data

(63) Continuation-in-part of application No. 16/177,932, filed on Nov. 1, 2018, now abandoned.

(30) Foreign Application Priority Data

May 29, 2018 (TW) .................................. 107207069

(51) Int. Cl.
*F16B 19/08* (2006.01)
*F16B 5/04* (2006.01)

(52) U.S. Cl.
CPC .............. *F16B 5/04* (2013.01); *F16B 19/086* (2013.01)

(58) Field of Classification Search
CPC ........ F16B 5/04; F16B 5/0096; F16B 5/0208; Y10T 29/49833; Y10T 29/49934; Y10T 29/49943; Y10T 29/49956
See application file for complete search history.

(56) References Cited

U.S. PATENT DOCUMENTS

| | | | |
|---|---|---|---|
| 3,242,962 A | | 3/1966 | Dupree |
| 3,909,913 A | * | 10/1975 | Tildesley ................ F16B 19/06 29/432 |
| 4,978,270 A | | 12/1990 | Ackerman |
| 5,651,172 A | | 7/1997 | Auriol et al. |
| 5,678,970 A | | 10/1997 | Caulk |
| 9,897,136 B1 | | 2/2018 | Wu et al. |
| 2004/0003508 A1 | | 1/2004 | Wu |
| 2004/0025295 A1 | | 2/2004 | Becker et al. |

(Continued)

*Primary Examiner* — Jason L Vaughan
*Assistant Examiner* — Amanda Kreiling
(74) *Attorney, Agent, or Firm* — Muncy, Geissler, Olds & Lowe, P.C.

(57) ABSTRACT

Board member fastener used to rivet first board member and second board member. First and second board members each have drilled therein a different diameter of hole. First board member provides first through hole. Second board member provides second through hole. Top of first through hole of first board member is formed with stop surface that tapers toward outer diameter so that when board member fastener is punch impacted, board member fastener sinks into interior of first through hole to cut second board member and to deform, and first board member is forced by sinking stress of board member fastener and tightly pressed on second board member upon punch impact, and thus, board member fastener, first board member and second board member are deformed and fitted to each other, achieving a riveting structure that can be applied to different materials and can overcome deformation caused by heat expansion and contraction.

9 Claims, 6 Drawing Sheets

(56) References Cited

U.S. PATENT DOCUMENTS

| | | |
|---|---|---|
| 2006/0099050 A1 | 5/2006 | Maloney |
| 2006/0251495 A1 | 11/2006 | Opper |
| 2009/0256453 A1 | 10/2009 | Wang et al. |
| 2016/0281757 A1 | 9/2016 | Hofmann et al. |
| 2018/0258966 A1 | 9/2018 | Wu |
| 2018/0274577 A1 | 9/2018 | Coldwell et al. |

* cited by examiner

BOARD MEMBER FASTENER

This application is a Continuation-In-Part of application Ser. No. 16/177,932, filed on Nov. 1, 2018, for which priority is claimed under 35 U.S.C. § 120, the entire contents of which are hereby incorporated by reference.

This application claims the priority benefit of Taiwan patent application number 107207069, filed on May 29, 2018.

BACKGROUND OF THE INVENTION

1. Field of the Invention

The present invention relates to fasteners more particularly, to a board member fastener, which enables a first board member and a second board member to be mutually deformed and fitted, achieving a riveted structure that is applicable to different materials and can overcome the deformation caused by heat expansion and contraction.

2. Description of the Related Art

Nowadays, electronic technology is growing at an ever-changing speed, making the development trend of computers also move towards the direction of strong computing functions, high speed, and small size. Due to that computer performance and quality requirements are getting higher and higher, setting only the basic components in the mainframe will not be enough. It is necessary to continuously expand electronic devices or equipment of enhanced performance, or to connect external computer peripherals so as to meet the needs of users at work or enjoyment.

Furthermore, the server of a general industrial computer usually has arranged therein a plurality of computer components such as motherboard, hard disk, fan module, and power supply. When setting these computer components in a computer mainframe, it is often necessary to join board members in a stack. When two board members are to be fixed together, adhesive bonding, screw joint or fusion is normally employed for non-metal board members. In contrast, metal board members are normally fixed by screwing or riveting, and the reason why metal board members are to be fixed by screwing or riveting is to ensure that the metal board joint structure is not easily separated by external stress. The technique of riveting is to pass a metal pin made with a head at its one end through holes in two or more board members, and then to hammer the other end of the metal pin into a head after its insertion through the holes in the board members. Riveting is one of the best fixing methods for assembling metal board members without considering the problem of board member disassembly.

The conventional method of riveting two board members is to punch a hole of the same diameter on each of the two board members, then to stack up the two board members, and then to insert a rivet into the holes of the two board members, and then to process the plain end of the rivet into a semispherical head by hot riveting or applying stress so as to hold down the two board members. However, this riveting method has drawbacks. Due to the processing or heat expansion and contraction factors, the deformation of the two board members cannot be eliminated through the simple riveting structure, so that gaps are easily generated between the two board members, resulting in rotation of the two board members about the rivet. This dynamic state does not meet the requirements of riveting. Furthermore, the semispherical head at each of the two opposite ends of the rivet will affect the assembly of adjacent components or cause interference. The aforementioned problems are to be pursued by those skilled in the industry.

SUMMARY OF THE INVENTION

The present invention has been accomplished under the circumstances in view. It is therefore a main object of the present invention to provide a board member fastener used to rivet at least two board members including a first board member and a second board member. The first and second board members each have drilled therein a different diameter of hole. The first board member provides a first through hole. The second board member provides a second through hole. The top of the first through hole of the first board member is formed with a stop surface that tapers toward the outer diameter so that when the board member fastener is punch impacted, the board member fastener sinks into the interior of the first through hole to cut the second board member and to deform, and the first board member is forced by the sinking stress of the board member fastener and tightly pressed on the second board member upon the punch impact, and thus, the board member fastener, the first board member and the second board member are deformed and fitted to each other, achieving a riveting structure that can be applied to different materials and can overcome the deformation caused by heat expansion and contraction.

According to another aspect of the present invention, the first through hole of the first board member has a deep recess so that the board member fastener is completely immersed in the first through hole after being punched and impacted. Furthermore, a processing platform is disposed at the bottom side of the second board member so that the bottom portion of the board member fastener and the bottom side of the second board member are kept in the same plane, and after the punching riveting process, the two ends of the board member fastener are not protruded from the first board member and the second board member, so that the flatness of the two opposite surfaces of the riveted board members can be maintained, having the advantages of good outer appearance and wide application range.

According to still another aspect of the present invention, the board member fastener comprises a through hole inside, an inner taper surface located above the through hole and in the shape of a funnel that is inclined outward and upward, a planar force-bearing portion connected outside the inner taper surface, an outer taper surface connected to an outer side of the planar force-bearing portion away from the inner taper surface and inclined outward and downward in a different direction and at a different angle relative to the inner taper surface, a vertical outer ring surface connected below the outer taper surface, a beveled surface connected below the vertical outer ring surface and inclined in a different direction and at a different angle relative to the outer taper surface, a straight cylindrical deformation portion connected below the beveled surface, which is deformed and pressed in the first through hole and the second through hole when the board member fastener is punch impacted, a bottom portion with reduced outer diameter connected below the straight cylindrical deformation portion, and a ring groove recessed between the straight cylindrical deformation portion and the bottom portion so that when the board member fastener is impacted by stamping, the ring groove is used to deform, fit and be fixed to the second board member. The inner taper surface and the outer taper surface are inclined in different directions and at different angles and define therebetween an included angle (θ) between 15°~165°, and preferably between 30°~150°, i.e., the included angle (θ) defined between the inner taper surface and the outer taper surface is less than 180°. The preferred inclination angle (α) of the inner taper surface is 45°±30°, the preferred inclination angle (β) of the outer taper surface is 45°±30°, so that the included angle (θ) between the inner taper surface and outer taper surface forms a 90°±60° angle design, which can be used for the inclination angle (α), inclination angle (β) and included angle (θ) all have a good structural stress angle.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
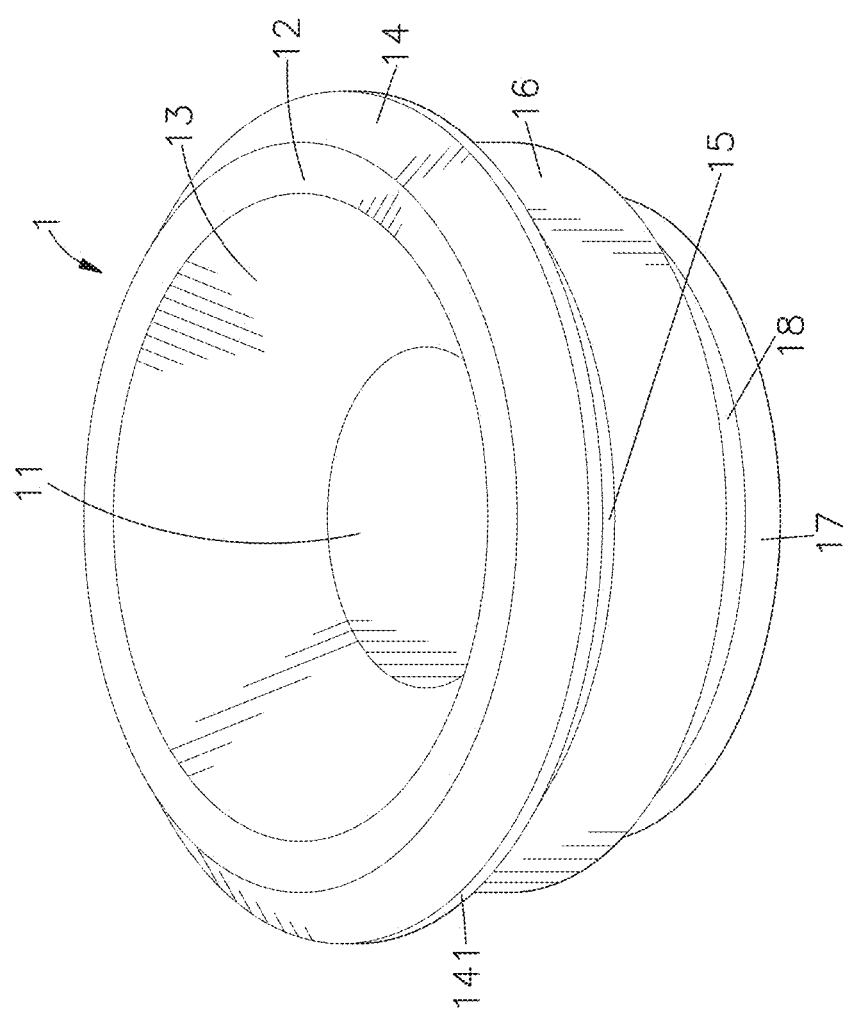
FIG. 1 is an oblique top elevational view of a board member fastener in accordance with the present invention.
Figure 2:
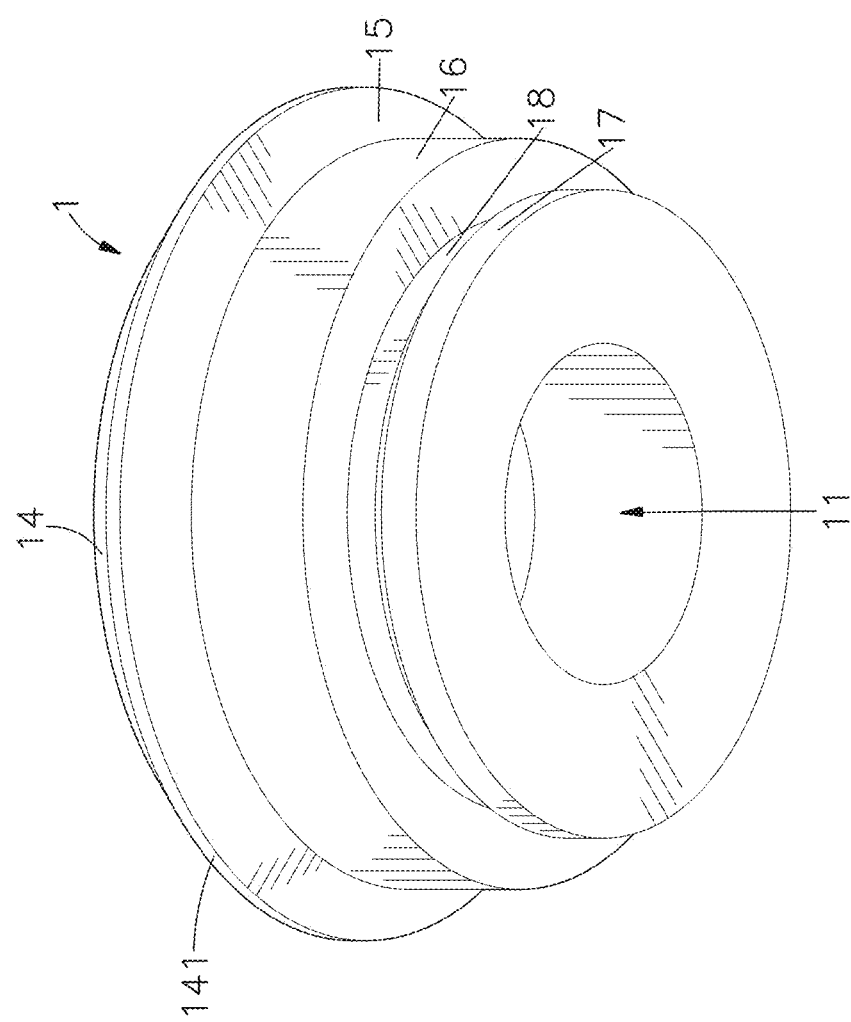
FIG. 2 is an oblique bottom elevational view of the board member fastener in accordance with the present invention.
Figure 3:
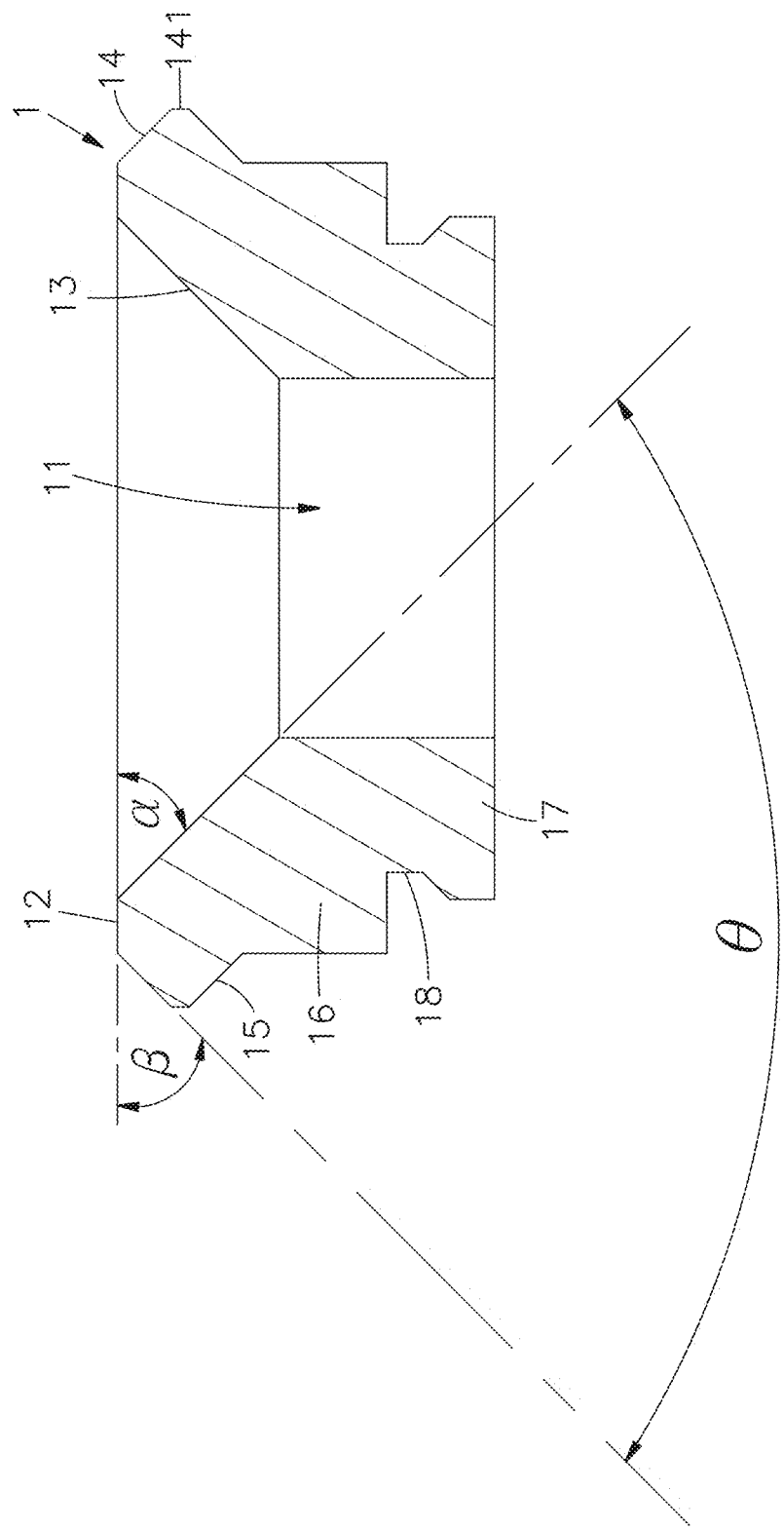
FIG. 3 is a sectional side view of the board member fastener in accordance with the present invention.
Figure 4:
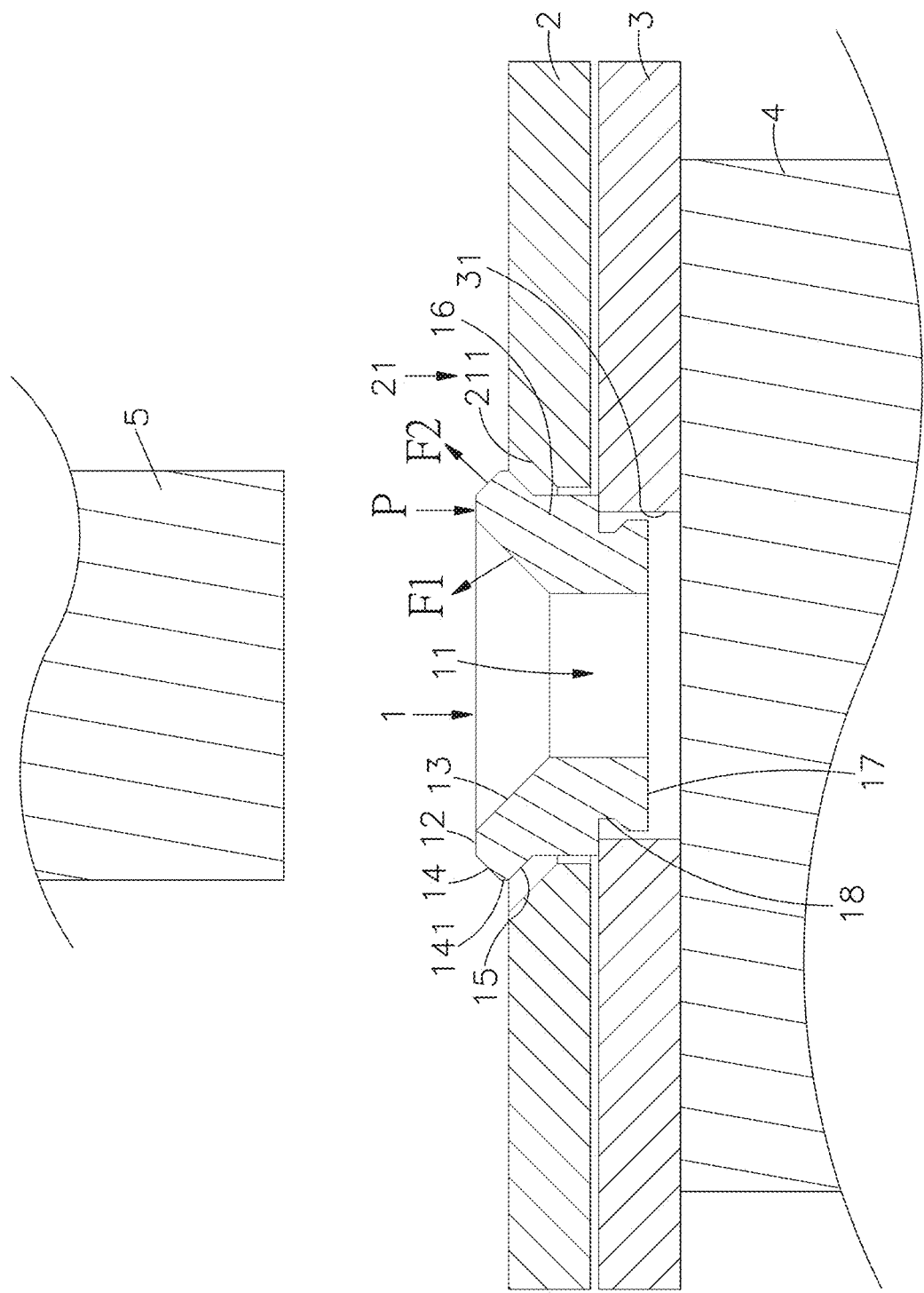
FIG. 4 is a schematic diagram of a first action of punching and riveting the board member fastener and two board members.
Figure 5:
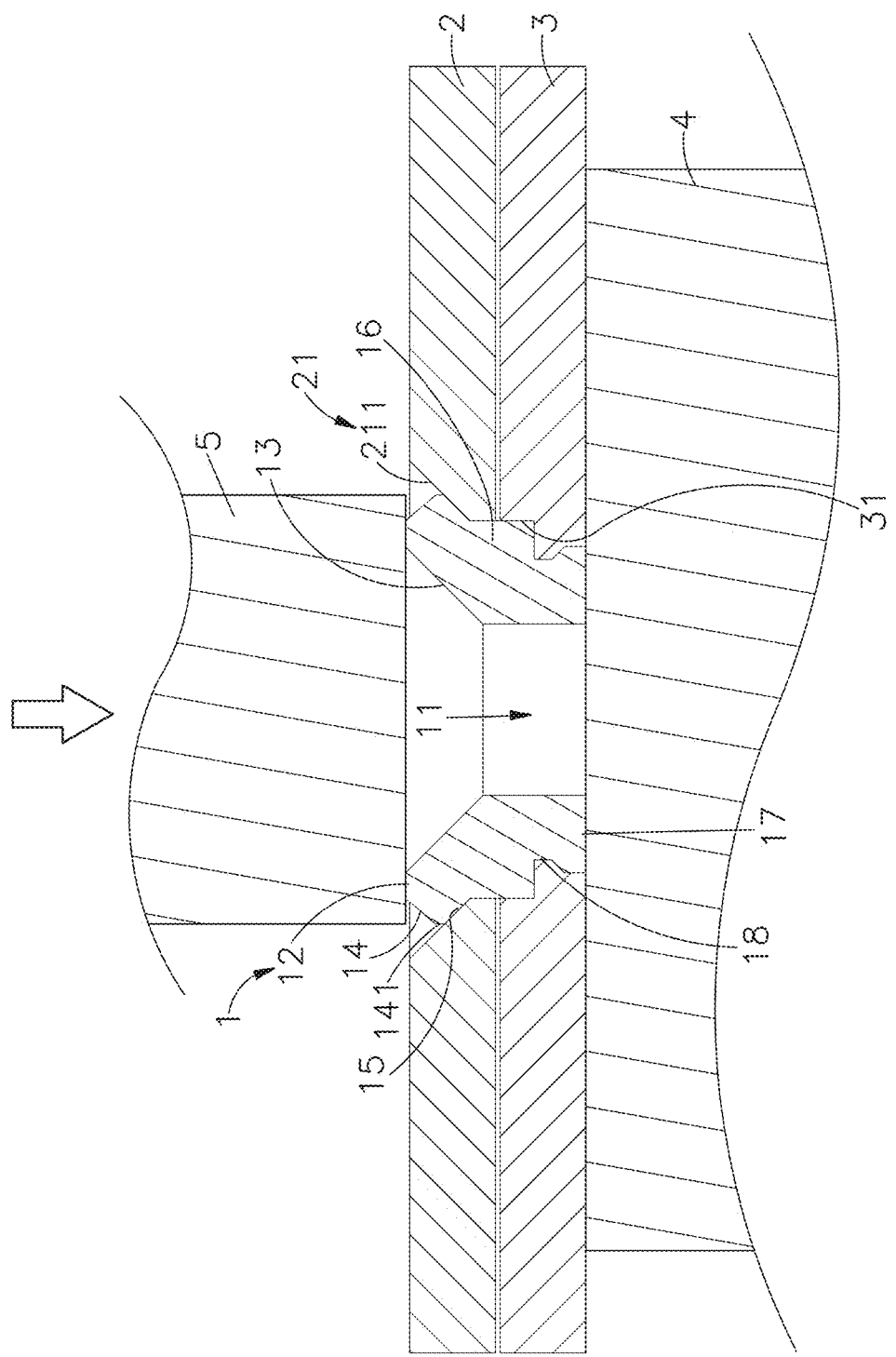
FIG. 5 is a schematic diagram of a second action of punching and riveting the board member fastener and the two board members.

Referring to FIGS. 1-5, an oblique top elevational view of a board member fastener in accordance with the present invention, an oblique bottom elevational view of the board member fastener, a sectional side view of the board member fastener, a schematic diagram of a first action of punching and riveting the board member fastener and two board members, a schematic diagram of a second action of punching and riveting the board member fastener and the two board members, a schematic diagram of a third action of punching and riveting the board member fastener and the two board members are shown. As illustrated, the board member fastener 1 is used to affix a first board member 2 and a second board member 3. The first board member 2 provides a first through hole 21. The second board member 3 provides a second through hole 31. By means of punching the board member fastener 1, the first board member 2 and the second board member 3 are affixed together, and the gap between the first board member 2 and the second board member 3 is eliminated.

The board member fastener 1 comprises a through hole 11 inside, an inner taper surface 13 located above the through hole 11 and in the shape of a funnel that is inclined outward and upward, a planar force-bearing portion 12 connected outside the inner taper surface 13, an outer taper surface 14 connected to an outer side of the planar force-bearing portion 12 away from the inner taper surface 13 and inclined outward and downward in a different direction and at a different angle relative to the inner taper surface 13, a vertical outer ring surface 141 connected below the outer taper surface 14, a beveled surface 15 connected below the vertical outer ring surface 141 and inclined in a different direction and at a different angle relative to the outer taper surface 14, a straight cylindrical deformation portion 16 connected below the beveled surface 15, which can be deformed and pressed in the first through hole 21 and the second through hole 31 when the board member fastener 1 is punch impacted, a bottom portion 17 with reduced outer diameter connected below the straight cylindrical deformation portion 16, and a ring groove 18 recessed between the straight cylindrical deformation portion 16 and the bottom portion 17 so that when the board member fastener 1 is impacted by stamping, the ring groove 18 is used to deform, fit and be fixed to the second board member 3.

The hardness of the board member fastener 1 is greater than that of the second board member 3, and the hardness of the board member fastener 1 is greater than or equal to the first board member 2.

The aperture of the first through hole 21 is larger than the aperture of the second through hole 31.

The top of the first through hole 21 of the first board member 2 is formed with a stop surface 211 which is gradually enlarged toward the outer diameter for the abutment of the beveled surface 15 of the board member fastener 1.

The inner taper surface 13 and outer taper surface 14 of the board member fastener 1 are inclined in different directions and at different angles. The included angle (θ) between the inner taper surface 13 and the outer taper surface 14 can be between 15°~165°, and the preferred included angle (θ) can be between 30°~150°, then the included angle (θ) between the inner taper surface 13 and the outer taper surface 14 is less than 180°. The preferred inclination angle (α) of the inner taper surface 13 can be 45°±30°, that is, the preferred inclination angle (α) of the inner taper surface 13 can be an angle between 15° and 75°. The preferred inclination angle (β) of the outer taper surface 14 can be 45°±30°, that is, the preferred inclination angle (β) of the outer taper surface 14 can be an angle between 15° and 75°, so that the included angle (θ) between the inner taper surface 13 and outer taper surface 14 forms a 90°±60° angle design, which can be used for the inclination angle (α), inclination angle (β) and included angle (θ) all have a good structural stress angle.

Referring to FIGS. 3-5 again, when the board member fastener 1, the first board member 2 and the second board member 3 are subjected to the punching and impacting process, a processing platform 4 is disposed at the bottom side of the second board member 3, and a punch 5 is disposed above the board member fastener 1, and then the punch 5 is stamped against the planar force-bearing portion 12 of the board member fastener 1 to complete the punching impact process.

Therefore, the present invention is mainly designed for a board member fastener used to rivet at least two board members 2, 3 (The present invention only cites the riveting structure of two board members but it can also be applied to more than two board members, and the riveted structure of more than two board members is still within the protection scope of the present invention). The two board members include the first board member 2 and the second board member 3, each having drilled therein a different diameter of through hole. The first board member 2 provides the first through hole 21. The second board member 3 provides the second through hole 31. The top of the first through hole 21 of the first board member 2 is provided with the stop surface 211 which is gradually enlarged toward the outer diameter (in the shape of a funnel). The hole diameters of the first through hole 21, the stop surface 211 and the second through hole 31 will have tolerances due to margins during manufacturing, resulting in changes in different hole diameters for the first through hole 21, the stop surface 211 and the second through hole 31. When the board member fastener 1 is punched and impacted by the external force of the punch 5, the force-bearing portion 12 of the board member fastener 1 bears the punching impact force (P) of the punch 5 and transfers the impact force (P) to the inner taper surface 13 and the outer taper surface 14, thereby producing different punching impact component forces (F1, F2) (see FIGS. 4 and 5).

Figure 6:
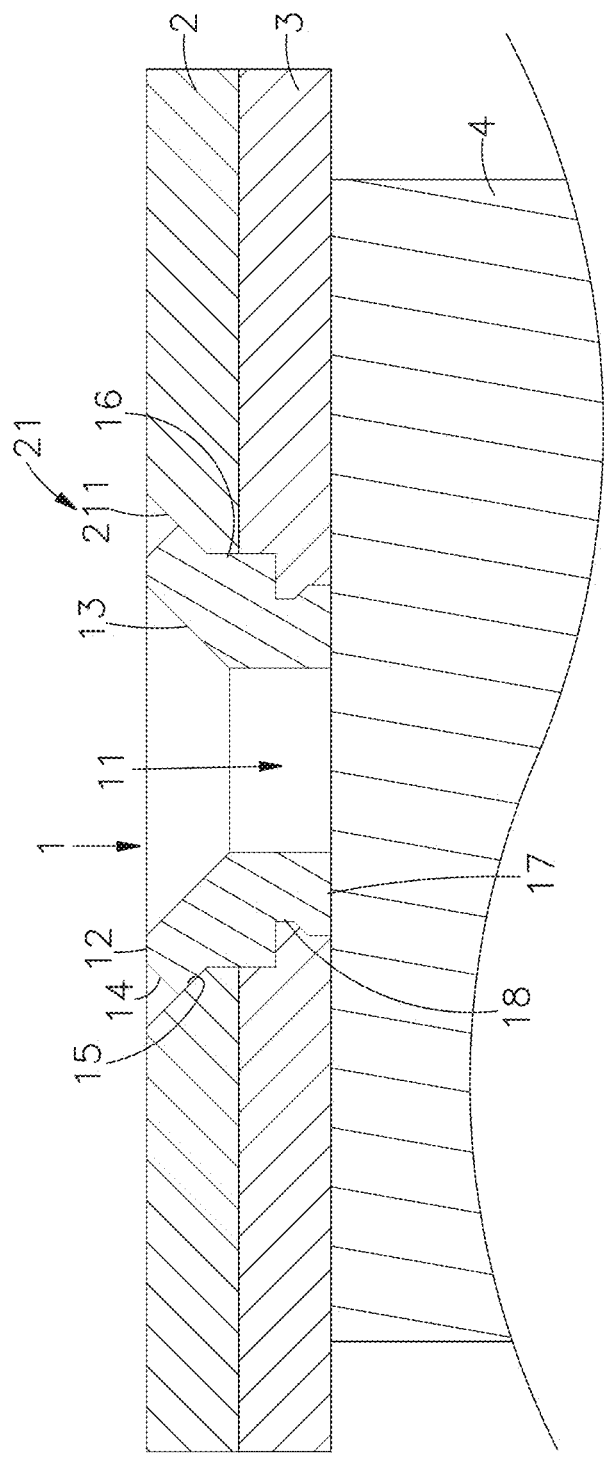
FIG. 6 is a schematic diagram of a third action of punching and riveting the board member fastener and the two board members.

The outer taper surface 14 bears the component force (F2) of the punching impact and pushes the beveled surface 15 and the straight cylindrical deformation portion 16, which causes the beveled surface 15 to deform and squeeze the vertical outer ring surface 141 by changing the inclination angle. The outer taper surface 14 and the beveled surface 15 squeeze the vertical outer ring surface 141, and the deformation of the beveled surface 15 closely fits the stop surface 211 (see also FIG. 6). After the straight cylindrical deformation portion 16 of the board member fastener 1 receives the punching impact and sinks into the first through hole 21, the straight cylindrical deformation portion 16 cuts the second board member 3 and deforms. When the stop surface 211 of the first board member 2 is subjected to the straight cylindrical deformation portion 16 of the board member fastener 1 during the stamping and impact, the straight cylindrical deformation portion 16 of the board member fastener 1 sinks into the second board member 3 and tightly fitted with the second board member 3 to eliminate the gap between the first board member 2 and the second board member 3. Thus, the board member fastener 1, the first board member 2 and the second board member 3 are deformed and fitted to each other. It can solve the gap between the board member fastener 1 and the first through hole 21, the stop surface 211 and the second through hole 31 due to the manufacturing tolerance, and form a tight and stable fit, and can be applied to different materials and can overcome the deformation caused by heat expansion and contraction. Furthermore, the first through hole 21 of the first board member 2 has a deep recess, so that the board member fastener 1 is completely submerged into the first through hole 21 after being impacted by punching. Furthermore, the processing platform 4 is disposed at the bottom side of the second board member 3 so that the bottom portion 17 of the board member fastener 1 and the bottom side of the second board member 3 are kept in the same plane. After the punching riveting process, the two ends of the board member fastener 1 are not protruded from the first board member 2 and the second board member 3, so that the flatness of the two opposite surfaces of the riveted board members can be maintained, having the advantages of good outer appearance and wide application range. In addition, the first board member 2 and second board member 3 are different due to different materials, processing operations and other factors. The margin produces tolerances, and there are large and small changes in hole diameters. At the same time, the stop surface 211 of the first through hole 21 will also produce larger or smaller tilt angle changes. Furthermore, the hole diameters of the first through hole 21, the stop surface 211 and the second through hole 31 will have tolerances due to margins during manufacturing, and there are large and small changes in hole diameter for the first through hole 21, the stop surface 211 and the second through hole 31. At the same time, the stop surface 211 of the first through hole 21 will also produce larger or smaller inclination angle changes.

When the planar force-bearing portion 12 of the board member fastener 1 bears the impact force of the punch 5, the outer taper surface 14 is subjected to the component force of the punching impact and pushes the beveled surface 15 and the straight cylindrical deformation portion 16, so that the beveled surface 15 is deformed to change the inclination angle and the straight cylindrical deformation portion 16 is also deformed and completely and tightly fitted into the first through hole 21 and stop surface 211 of the first board member 2. After the straight cylindrical deformation portion 16 of the board member fastener 1 receives the punching impact of the punch 5 and sinks into the first through hole 21, the straight cylindrical deformation portion 16 cuts the second board member 3 and deforms. When the stop surface 211 of the first board member 2 is subjected to the straight cylindrical deformation portion 16 of the board member fastener 1 during the stamping and impact, the straight cylindrical deformation portion 16 of the board member fastener 1 sinks into the second through hole 31 of the second board member 3 and tightly fitted with the second through hole 31 of the second board member 3 to eliminate the gap between the first board member 2 and the second board member 3. Thus, the board member fastener 1, the first board member 2 and the second board member 3 are deformed and fitted to each other. It can solve the gap between the board member fastener 1 and the first through hole 21, the stop surface 211 and the second through hole 31 due to the manufacturing tolerance, and form a tight and stable fit, which will not be easy to shake, loose or detach. The tolerance changes of the first through hole 21 and stop surface 211 of the first board member 2 and the second through hole 31 of the second board member 3 caused by the margin during manufacturing does not affect the stability and tightness of the fitting and fixing between the board member fastener 1 and the first board member 2 and second board member 3. It can form a tight and stable fit between the board member fastener 1 and the first board member 2 and second board member 3, and it is not easy to produce gaps.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A board member fastener used to affix a first board member and a second board member together, said first board member providing a first through hole, said second board member providing a second through hole, said board member fastener being inserted into said first through hole and said second through hole and punch impacted so that said board member fastener, said first board member and said second board member are affixed together to eliminate the gap between said first board member and said second board member, said board member fastener comprising a through hole inside, an inner taper surface located above said through hole and in the shape of a funnel that is inclined outward and upward, a planar force-bearing portion connected outside said inner taper surface, an outer taper surface connected to an outer side of said planar force-bearing portion away from said inner taper surface and inclined outward and downward in a different direction and at a different angle relative to said inner taper surface, a vertical outer ring surface connected below said outer taper surface, a beveled surface connected below said vertical outer ring surface and inclined in a different direction and at a different angle relative to said outer taper surface, a straight cylindrical deformation portion connected below said beveled surface, which is deformed and pressed in said first through hole and said second through hole when said board member fastener is punch impacted, a bottom portion with reduced outer diameter connected below said straight cylindrical deformation portion, and a ring groove recessed between said straight cylindrical deformation portion and said bottom portion so that when said board member fastener is impacted by stamping, said ring groove is used to deform, fit and be fixed to said second board member.

2. The board member fastener as claimed in claim 1, wherein said inner taper surface and said outer taper surface define therebetween an included angle less than 180°.

3. The board member fastener as claimed in claim 2, wherein said inner taper surface has a funnel-shaped structure; said inner taper surface and said outer taper surface are inclined in different directions and at different angles and define therebetween an included angle between 15°~165°, and preferably between 30°~150°.

4. The board member fastener as claimed in claim 2, wherein the preferred inclination angle of said inner taper surface is 45°±30°, the preferred inclination angle of said outer taper surface is 45°±30°, and the included angle defined between said inner taper surface and said outer taper surface is most preferably 90°±60°.

5. The board member fastener as claimed in claim 1, wherein said planar force-bearing portion, said inner taper surface, said outer taper surface and said beveled surface are deformed and expanded in said first through hole of said first board member and tightly abutted to said first board member when said board member fastener is punch impacted.

6. The board member fastener as claimed in claim 1, wherein the hardness of said board member fastener is greater than or equal to the hardness of said first board member and the hardness of said second board member.

7. The board member fastener as claimed in claim 1, wherein a top of said first through hole of said first board member is formed with a stop surface which is gradually enlarged toward the outer diameter for the abutment of said beveled surface of said board member fastener.

8. The board member fastener as claimed in claim 1, wherein the aperture of said first through hole is larger than the aperture of said second through hole.

9. The board member fastener as claimed in claim 1, wherein when said board member fastener, said first board member and said second board member are subjected to the punching and impacting process, a processing platform is disposed at a bottom side of said second board member, and a punch is disposed above said board member fastener, and then said punch is stamped against said planar force-bearing portion of said board member fastener to complete the punching impact process.

\* \* \* \* \*